(12) United States Patent  (10) Patent No.: US 7,766,608 B2
Wobben  (45) Date of Patent: Aug. 3, 2010

(54) WIND ENERGY PLANT WITH MARINE LIFE GROWTH PROMOTING STRUCTURE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 754 days.

(21) Appl. No.: 11/324,189

(22) Filed: Dec. 29, 2005

(65) Prior Publication Data

US 2006/0170221 A1  Aug. 3, 2006

Related U.S. Application Data

(63) Continuation-in-part of application No. PCT/EP2004/002863, filed on Mar. 19, 2004.

(30) Foreign Application Priority Data

Jul. 1, 2003  (DE) .............................. 203 10 089 U

(51) Int. Cl.
*F03D 11/04*  (2006.01)
(52) U.S. Cl. .................................... 415/121.3; 415/905
(58) Field of Classification Search ............ 416/146 R, 416/244 R, 244 A, 246; 415/2.1–4.5, 121.3, 415/905–908; 290/44, 55
See application file for complete search history.

(56) References Cited

U.S. PATENT DOCUMENTS

| | | | | | |
|---|---|---|---|---|---|
| 1,786,342 | A | * | 12/1930 | Greene | 43/8 |
| 3,741,163 | A | * | 6/1973 | Bush | 119/54 |
| 3,905,143 | A | * | 9/1975 | Poirot | 43/7 |
| 4,086,874 | A | * | 5/1978 | Sterner | 119/223 |
| 4,579,198 | A | * | 4/1986 | Lee | 182/115 |
| 5,538,101 | A | * | 7/1996 | Kempf | 182/116 |
| 5,564,369 | A | * | 10/1996 | Barber et al. | 119/221 |
| 5,596,947 | A | * | 1/1997 | Creppel et al. | 119/223 |
| 5,799,752 | A | * | 9/1998 | Perry | 182/206 |
| 2003/0107029 | A1 | * | 6/2003 | Hanson et al. | 254/362 |
| 2003/0168864 | A1 | * | 9/2003 | Heronemus et al. | 290/55 |

FOREIGN PATENT DOCUMENTS

| | | | |
|---|---|---|---|
| DE | 27 19 081 | A1 | 2/1978 |
| DE | 298 14 313 | U1 | 11/1998 |
| EP | 1234978 | A2 * | 8/2002 |
| EP | 1 291 521 | A1 | 3/2003 |
| GB | 2 365 385 | A | 2/2002 |
| JP | 01253572 | A * | 10/1989 |
| RU | 2247495 | C1 * | 3/2005 |
| WO | WO 01/23253 | A1 | 4/2001 |
| WO | WO 0123253 | A1 * | 4/2001 |

(Continued)

OTHER PUBLICATIONS

Gipe, Paul, Wind Energy Comes of Age, John Wiley and Sons, 1995, 398-402. ISBN 047110924X, 9780471109242.*

(Continued)

*Primary Examiner*—Richard Edgar
(74) *Attorney, Agent, or Firm*—Seed IP Law Group PLLC

(57) ABSTRACT

The invention concerns a wind power installation, whether an offshore or an onshore wind power installation. An offshore wind power installation comprising an underwater construction which is externally provided with a structure which promotes a growth with marine fauna and flora for later harvest.

8 Claims, 5 Drawing Sheets

FOREIGN PATENT DOCUMENTS

WO   WO 2004/055272 A   *   7/2004

OTHER PUBLICATIONS

Towards a Cleaner Marine Environment, 2001, Miljøbutikken, pp. 1-27.*

Robinson, Jerome B., The Complete Hunter, 1999, The Lyons Press, pp. 454-456.*

2008 Pennsylvania State Hunting License issed to Primary Examiner.*

Söker et al., Offshore Wind Energy in the North Sea, Technical Possibilities and Ecological Considerations—A Study for Greenpeace, Oct. 2000, Deutsches Windenergie-Institut GmbH, pp. 1-83.*

Webster's 21st century dictionary. 1995 Edition. p. 212.*

Delort, E., et al., "Analysis of Initial Fouling Process in Coastal Environment: Effects of Settlement, Attachment, and Metamorphosis Promoters," *Mar Biotechnol* (*NY*), 2(3):224-230, May 2000.

Svane, I., et al., "On the Problems of Epibioses, Fouling and Artificial Reefs, a Review," *Marine Ecology*, 22(3):169-188, 2001.

M.A. Luchina et al., "Operating Experience of Hydraulic Structures and Equipment of Hydroelectric Stations," 8:788-793, Aug. 1978.

A. Kerr et al., "The effects of surface topography on the accumulation of biofouling," Philosophical Magazine, 53:2779-2795, Aug. 24, 2003.

* cited by examiner

WIND ENERGY PLANT WITH MARINE LIFE GROWTH PROMOTING STRUCTURE

BACKGROUND OF THE INVENTION

1. Field of the Invention

The invention concerns a wind power installation, whether an offshore or an onshore wind power installation.

2. Description of the Related Art

The current state of the art is generally shown in the following publications: DE 199 46 899; P 27 19 081 and DE 298 14 313. Offshore wind power installations have already been built while still more however are being planned at the present time. Whenever man-made edifices are erected in the sea the corresponding structures of the edifice which are below the waterline are provided with a coating which protects the edifice. It is also known in particular from ships that they are provided externally with a protective coating (TBT) which is not only chemically extremely problematical but also serves the purpose of preventing as far as possible the deposit of marine fauna and flora in relation to offshore wind power installations (mussels, barnacles and other marine life).

BRIEF SUMMARY OF THE INVENTION

In man-made structures today, such as oil rigs placed in the sea, efforts are made to prevent the growth of marine life. The invention proposes to provide an external structure which promotes a settlement of marine fauna and flora on or near the pylon of an offshore wind turbine.

The invention also proposes to provide an external structure to onshore wind turbines which allows for hunting wildlife from the wind turbine.

DETAILED DESCRIPTION OF THE INVENTION

The invention is based on the realization that a pylon structure in the case of an offshore wind power installation or any other kind of structure of the wind power installation which is below the waterline also acquires a quite particularly good protection by virtue of the fact that marine life is established thereon to a high degree. If, for example, the surface of the offshore wind power installation structure which is below the waterline is covered with mussels, such a mussel growth already provides excellent protection from the pounding of waves and at the same time also forms a natural layer which prevents attack by the relatively corrosive sea water.

Figure 1:
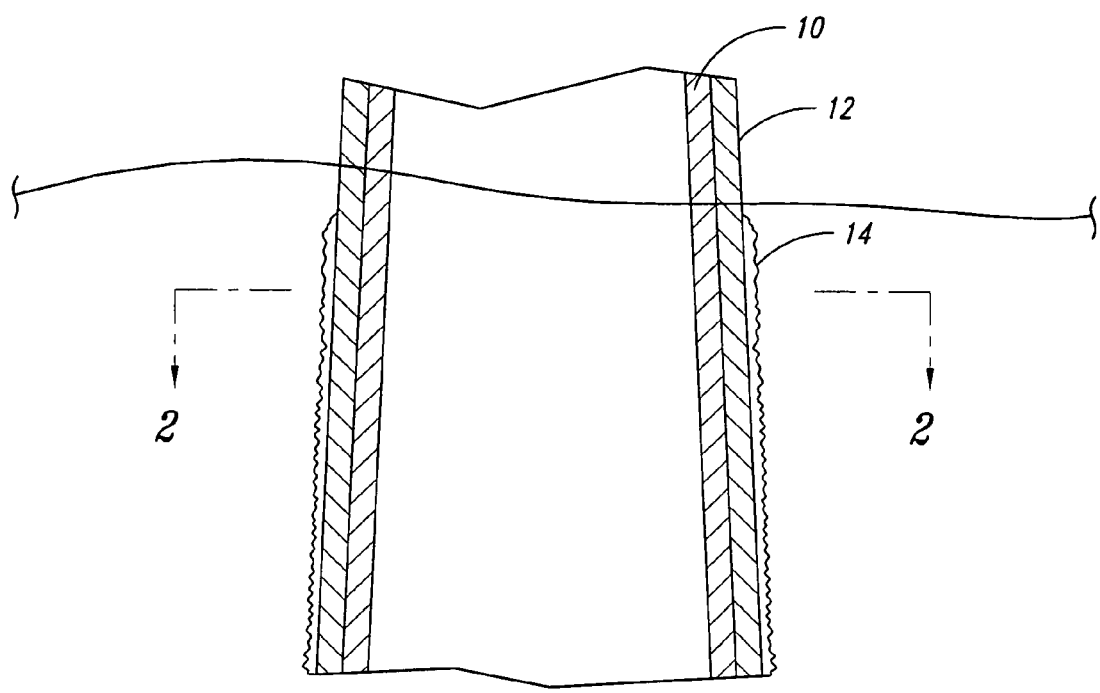
FIG. 1 shows a wind turbine pylon in water including a protective layer and a marine life growth enhancement layer according to the invention.
Figure 2:
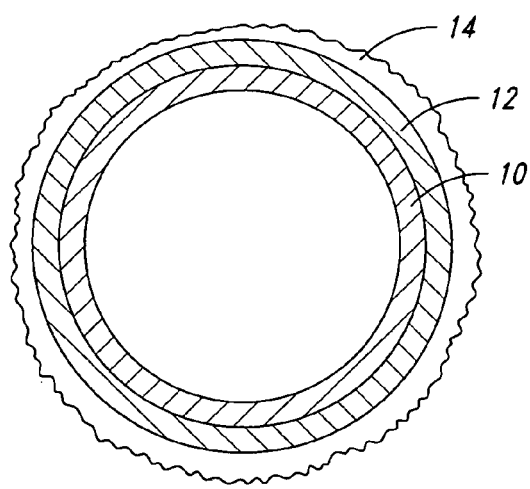
FIG. 2 shows a cross-sectional view of FIG. 1 on the line 2-2.

As shown in FIGS. 1 and 2, therefore the portion of the pylon wall 10 which is below the waterline of an offshore wind power installation is to be provided with a first protective layer 12 which prevents the penetration of water into the structure and then a growth structure 14, for example a very rough layer, which greatly promotes a growth of marine fauna and flora, is applied to that protective layer. A further second protective layer can also be provided between the two layers referred to hereinbefore, to prevent the marine fauna and flora growing on the further structure from attacking the first protective layer on the structure itself. In FIGS. 1 and 2, the layers 10, 12 and 4 are not to scale, but are shown for ease of viewing. Of course the pylon wall 10 will be much thicker than the protective layer 12 or growth layer 14. It may be made of steel, concrete or other know seaworthy material.

Figure 3:
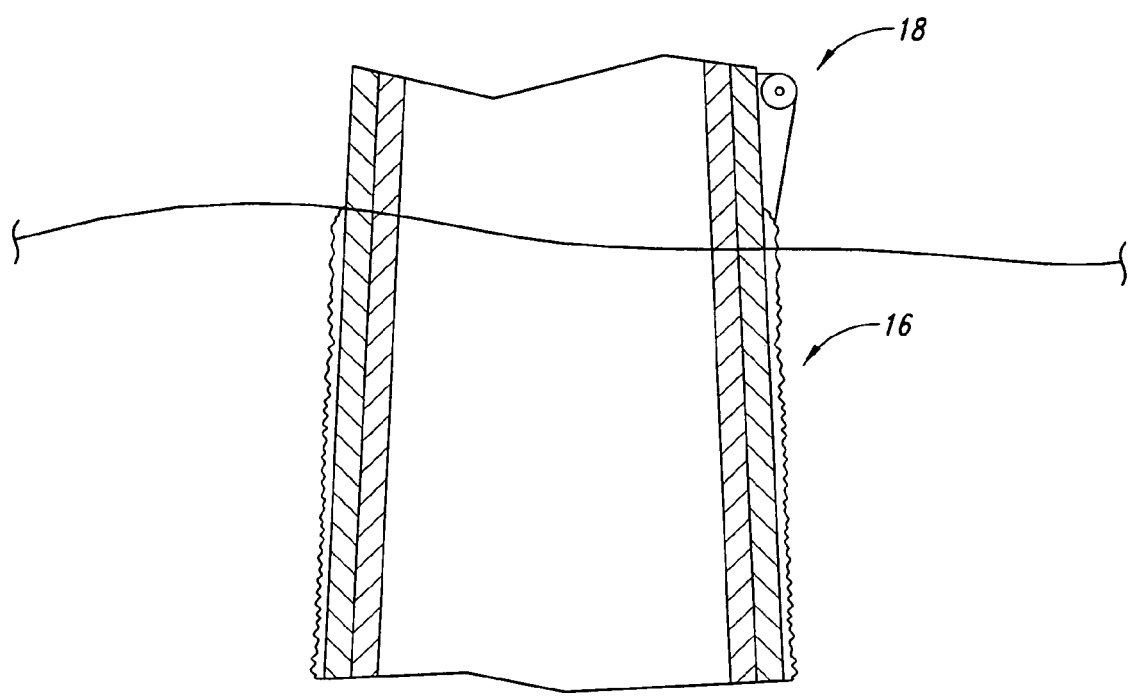
FIG. 3 shows a wind turbine pylon in water including a detachable marine life growth enhancement layer, according to an alternative embodiment.

As shown in FIG. 3, another embodiment of this invention is to have a detachable section 16 of marine life enhancement growth material 14 on the outside of the pylon which may be raised or lowered via an appropriate raising and lowering mechanism 18, for example, an electric winch. A stand or support platform may be attached to the pylon above the water line on which a user may stand to retrieve the growth layer 16 to harvest the marine life, change the marine support structure 16, add food, or make other changes. This provides a convenient way to collect attached marine life without going into the water. This also provides a convenient way to make changes to the growth enhancement material in order to attract different marine life for growth or harvest. Because the wind turbine generates electricity, the power is provided directly from the wind turbine. An electric winch is therefore preferred since there is convenient power source for the raising/lowering mechanism without the need to provide fuel or other outside energy sources. The wind turbine is thus fully self-supporting for the enhanced production of marine life.

The layer for promoting the establishment of marine fauna and flora thereon should be so adapted that mussels, barnacles or other marine fauna and flora can already be established to a high degree thereon within just a very short time, that is to say in less than a year.

Figure 4:
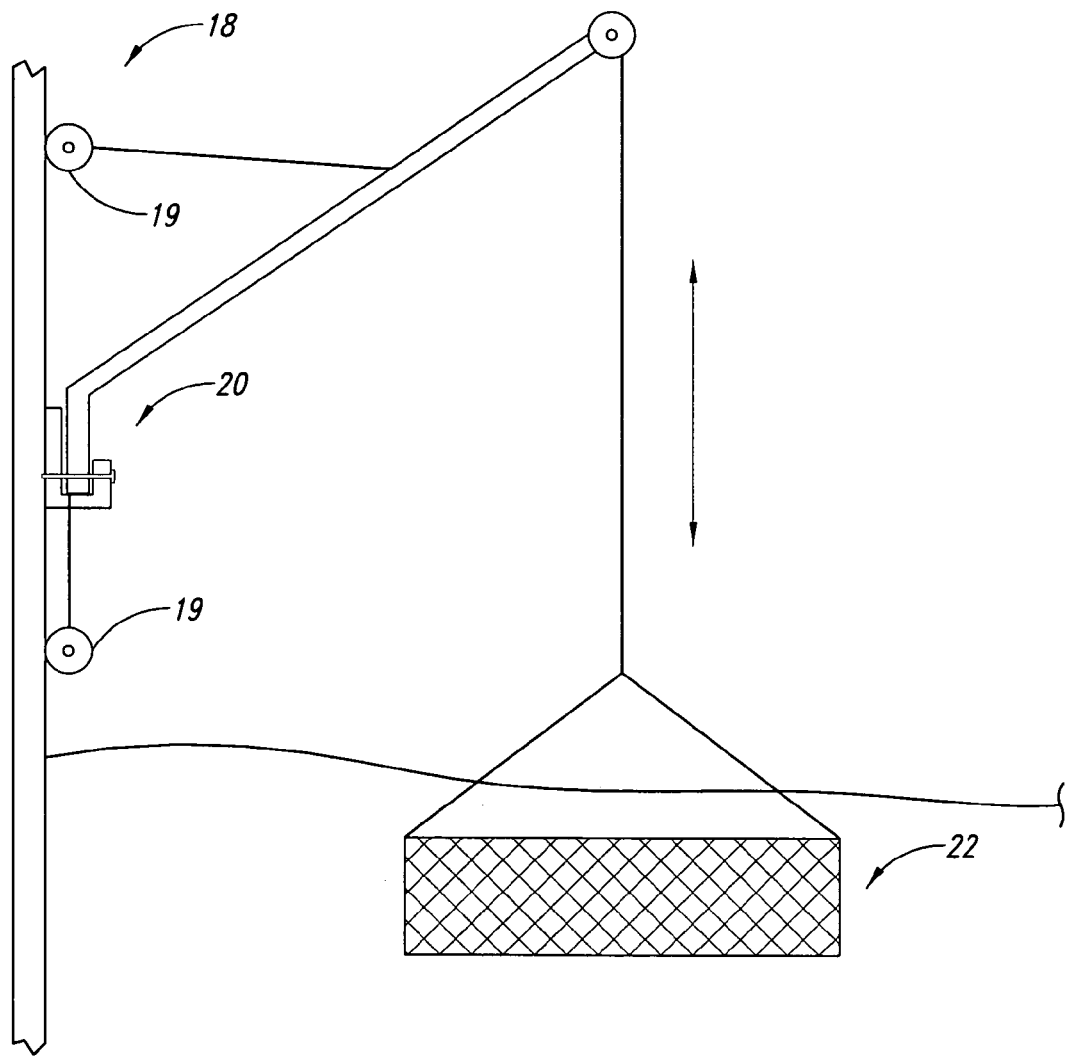
FIG. 4 shows a wind turbine pylon in water including a receiving device which may be lowered into or raised from the water via an electric winch according to an alternative embodiment.

As shown in FIG. 4, the growth layer may be in the form of a net 22 that is suspended from the pylon spaced some distance from the pylon so that marine life may grow on both sides thereof, to further enhance the use of the growth promoting layer.

For example, as an alternative but also as a supplement to the above description, it is possible to provide the pylon of the wind power installation in the lower region thereof with a receiving device 20. Such a receiving device can serve for example in the case of an offshore wind power installation to provide that shell fish nets, for example, oyster, mussel and fish farming nets or other mussel and marine life breeding arrangements 22 are received or held thereon. One or more electric winches 19 may be provided as part of the raising and lowering mechanism 18. FIG. 4 shows how a receiving device 20 in the lower region of the pylon receives a carrier on which for example a mussel basket 22 is suspended, which can be moved up and down by a cable and a corresponding winch 19. It will be appreciated that there are a large number of further variants for the receiving device 20 which however are apparent to the man skilled in the art. The receiving device can also involve fixed connecting points to which the respective illustrated articles can be secured, whether by screws, split pins or other securing means.

Accordingly the wind power installation can be used to promote the useful breeding of fish, mussels, cockles and the like. Accordingly the offshore wind power installation according to the invention affords the possibility of also using that installation for a fishing or other maritime purpose. As it is known that the water quality on the high seas is usually better than directly in the coastal region, the wind power installation according to the invention can also be used for maritime purposes over and above the generation of power, which overall enhances the usefulness of the wind power installation.

Figure 5:
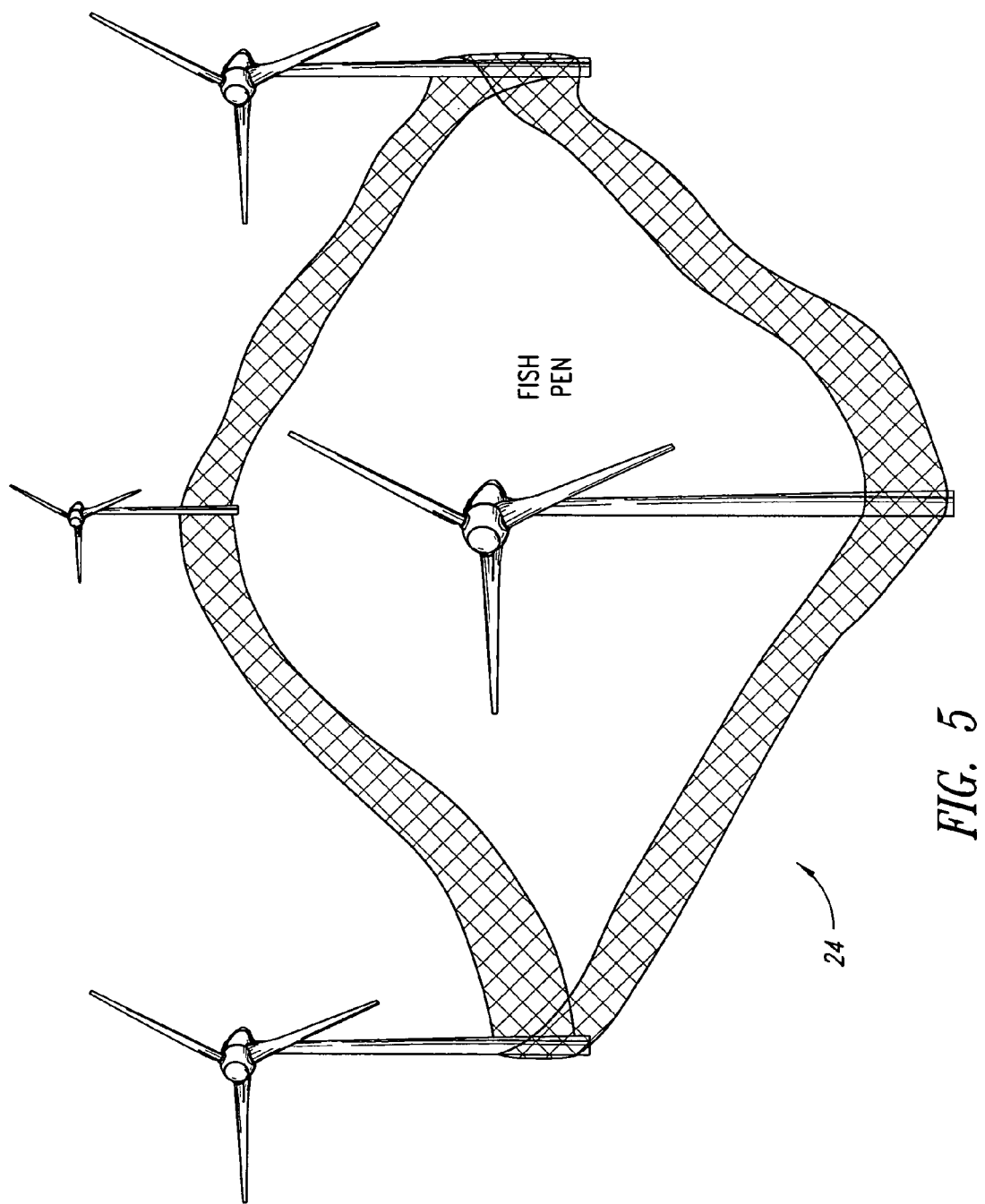
FIG. 5 shows a fishery made by placing a net around multiple wind turbine pylons according to an alternative embodiment.

As shown in FIG. 5, in the case where there are multiple wind turbines near each other in the sea, a net 24 may be placed around as many wind turbine pylons as desired to enclose a section of the sea which can be used as a fishery. Fish may be placed within the net to swim free, grow and breed within the net, but not escape. The net would keep out unwanted predators and allow for the enclosed sea life to be easily harvested.

The receiving device can also be adapted to receive rods, tubes or other devices for holding a net in the offshore region, that can be effected in such a way that the net arrangement in question always floats in the water at the same level, insofar as provision is made for a corresponding upward and downward movement of the nets with the tide, by means of floats.

By means of a suitable cable arrangement and by virtue of the hinged design the entire device can be lifted out of the water if that is desired.

Finally the quantities of feed which are necessary for the marine creatures can be stored within a space in the wind power installation and in addition automatic feeding can be effected from that space by means of an automatic feed supply arrangement. For that purpose there is provided for example a screw advance assembly, by means of which food from the feed bunker within the wind power installation can be passed to the feed arrangement.

Figure 6:
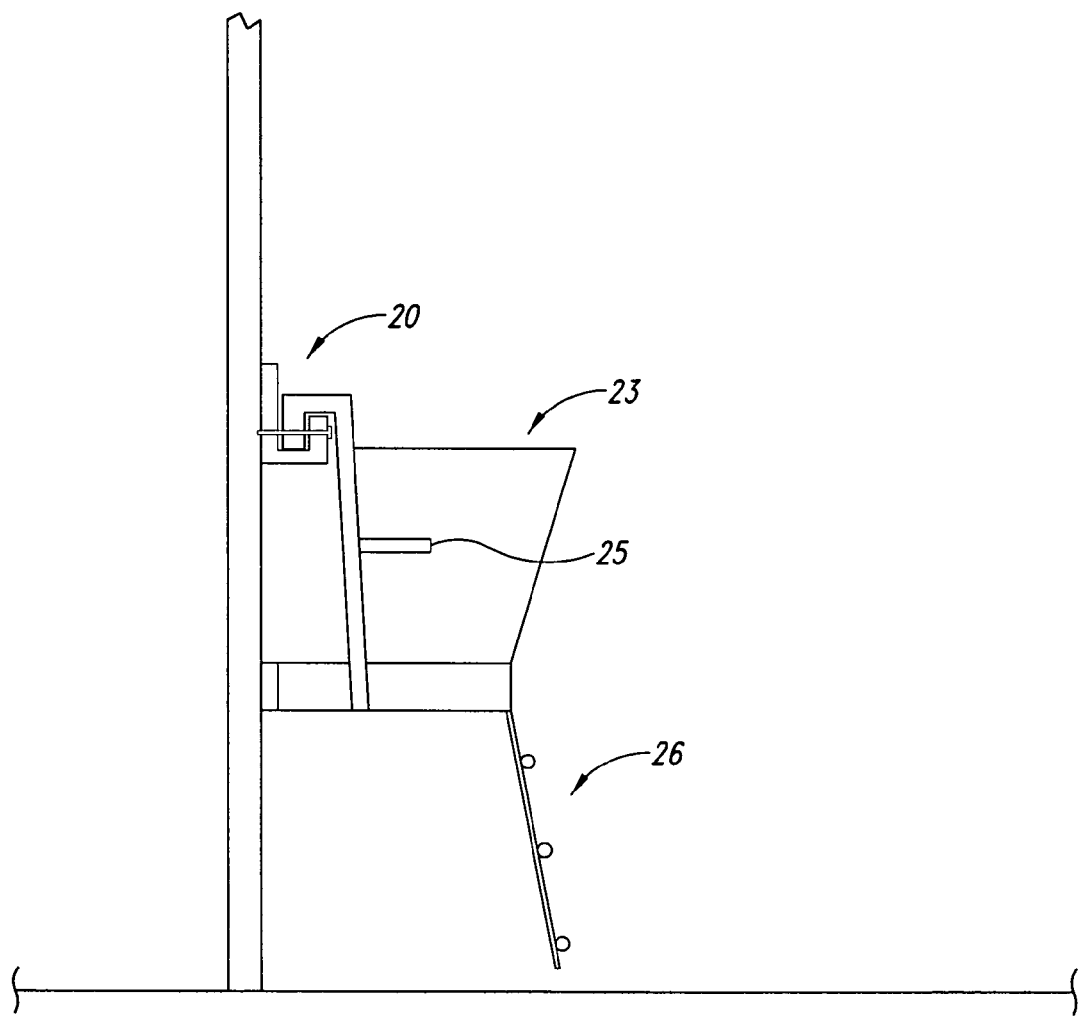
FIG. 6 shows a wind turbine pylon on land which has an attached hunting blind and hide ladder.

FIG. 6 shows a further possible option in the case of onshore wind power installations is that, by means of the receiving device 20, a raised-hide ladder 26, as is known from the usual hunting situation, is accommodated in the lower region of the pylon of the wind power installation by the receiving device. A hunters blind or shooting stand 23 is coupled to the receiving device 20 to be supported by the pylon of the wind turbine. A chair 25 or other user comforts can be provided in the hunter's blind 23.

It is particularly advantageous if the receiving device 20 is so designed that the hide ladder 26 or the article 23 accommodated thereby can be guided or fixed in a desired position on the pylon.

Game does not generally perceive wind power installations in the countryside as being a dangerous threat. If at all, the animals pay more attention to the rotatable parts of the wind power installation, that is to say to the uppermost region with the rotating rotor or the rotating machine housing. Accordingly mounting the hide ladder in the lowermost region of the pylon of the wind power installation is advantageous because the diversionary effect of the rotor and the machine housing means that the person on the hide ladder 26 is visually perceived by the animals to a lesser degree than usual.

It is also particularly advantageous if the pylon of the wind power installation, in the lowermost region, has a green or grey-green coat of paint (pylon color configuration) which is very substantially the same as the surrounding nature. The coloring of the hide ladder should correspond to the coloring of the pylon in the lower region.

The advantage of the configuration according to the invention is that the hide ladder 26 can be adjusted to any desired position, that is to say to any position around the pylon. The region is to be recessed at the location where a staircase which is accessible from the exterior or a door which is accessible from the exterior is provided, in order to permit access to the installation at any time.

At its lower end the ladder is spaced from the ground so as to prevent a lightning strike from being transmitted on through the ladder. Preferably for that purpose the receiving device 20 is so designed that there is a plastic material bridge between the hide ladder which can be made from metal and the pylon. That can be guaranteed insofar as a plastic ring is disposed between the pylon and the receiving device.

In addition the hide ladder 26 or hunter's blind 23 is preferably provided with a roof which in turn preferably is of metal in order thus to provide protection to the hide ladder or hunter's blind, which is screened like a Faraday cage.

To increase the distance of the lower end of the ladder from the ground, that end of the ladder can also be designed to be foldable so that, after the hide ladder has been ascended, the lower part is pivoted upwardly and thus the distance between the lower end of the ladder and the ground is correspondingly increased.

FIG. 6 shows how that device 20 can receive a raised hide-ladder 26. For that purpose the receiving device substantially comprises an L-shaped rail which surrounds the periphery of the pylon 10 and into which a hide ladder 26 can be fitted with a suitable co-operating portion and fixed to that rail, for example by screws. The hide ladder 26 is in turn supported in the central region against the pylon. The hide ladder can be positioned at any location on the periphery of the pylon.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An offshore wind power installation, comprising:
   a pylon extending in seawater towards the sea floor and having an underwater portion;
   a protective layer that protects the underwater portion from seawater corrosion, the protective layer covering underwater portions of the pylon;
   a wind turbine coupled at a top region of the pylon and positioned to be exposed to the wind;
   a structure which promotes the growth of marine fauna and flora coupled to the pylon and located external the protective layer; and
   marine life feed stored within the pylon and positioned to be dispensed from the wind power installation to feed marine life.

2. An offshore wind power installation, comprising:
   a pylon extending in seawater towards the sea floor and having an underwater portion;
   a protective layer that protects the underwater portion from seawater corrosion, the protective layer covering underwater portions of the pylon;
   a wind turbine coupled at a top region of the pylon and positioned to be exposed to the wind; and
   a structure which promotes the growth of marine fauna and flora coupled to the pylon and located external the protective layer, the structure having a roughness similar to the roughness of natural granite on which crustaceans such as mussels, barnacles and so forth can easily get established and become fixed.

3. An offshore wind power installation, comprising:
a pylon extending in seawater towards the sea floor and having an underwater portion;
a protective layer that protects the underwater portion from seawater corrosion, the protective layer covering underwater portions of the pylon;
a wind turbine coupled at a top region of the pylon and positioned to be exposed to the wind; and
a structure which promotes the growth of marine fauna and flora coupled to the pylon and located external the protective layer, the structure having a roughness similar to the roughness of natural sandstone on which crustaceans such as mussels, barnacles and so forth can easily get established and become fixed.

4. An offshore wind power installation, comprising:
a pylon extending in seawater towards the sea floor and having an underwater portion;
a protective layer that protects the underwater portion from seawater corrosion, the protective layer covering underwater portions of the pylon;
a wind turbine coupled at a top region of the pylon and positioned to be exposed to the wind; and
a structure which promotes the growth of marine fauna and flora coupled to the pylon and located external the protective layer, wherein the growth promoting structure is detachable, and may be raised from or lowered into the water by a raising and lowering device attached to the pylon.

5. The wind power installation according to claim 4 wherein the raising and lowering device includes an electric winch.

6. A wind power installation according to claim 4 in which the growth promoting structure is a net designed to promote growth or capture of marine life, which may be raised or lowered by the raising and lowering device.

7. A wind power installation according to claim 4 in that the raising and lowering device operates by power generated by the wind power installation.

8. An offshore wind power installation comprising:
a pylon coupled to the sea floor;
a structure coupled to an underwater portion of the pylon, the structure promoting growth of marine fauna and flora;
a feed bunker within the pylon for holding marine-life feed; and
a feed supply arrangement for passing feed from the feed bunker to the marine life outside of the pylon.

* * * * *